US012700294B2

(12) United States Patent
King

(10) Patent No.: US 12,700,294 B2
(45) Date of Patent: Aug. 4, 2026

(54) METHOD AND SYSTEM FOR DETERMINING ACTIVE EVENTS IN A 5G NETWORK

(71) Applicant: Boost SubscriberCo L.L.C., Englewood, CO (US)

(72) Inventor: Ian King, Cheyenne, WY (US)

(73) Assignee: Boost SubscriberCo L.L.C., Englewood, CO (US)

( * ) Notice: Subject to any disclaimer, the term of this patent is extended or adjusted under 35 U.S.C. 154(b) by 138 days.

(21) Appl. No.: 18/543,311

(22) Filed: Dec. 18, 2023

(65) Prior Publication Data

US 2025/0201102 A1 Jun. 19, 2025

(51) Int. Cl.
*G08B 25/00* (2006.01)
*G08B 25/01* (2006.01)

(52) U.S. Cl.
CPC ........... *G08B 25/007* (2013.01); *G08B 25/00* (2013.01); *G08B 25/01* (2013.01)

(58) Field of Classification Search
CPC ...... G08B 25/00; G08B 25/007; G08B 25/01; G06F 9/50; G06F 9/54; G06F 9/542; G06F 16/24; G06F 16/25; G06F 16/27
See application file for complete search history.

(56) References Cited

U.S. PATENT DOCUMENTS

2016/0248792 A1* 8/2016 Tidwell ............... G06F 16/2455
2024/0212432 A1* 6/2024 Lysaght .............. G07F 17/3244
2024/0256365 A1* 8/2024 Pankov ................... G06F 16/25
2025/0199884 A1* 6/2025 Sreekanth ............. G06Q 40/04

* cited by examiner

*Primary Examiner* — Van T Trieu
(74) *Attorney, Agent, or Firm* — Kilpatrick Townsend & Stockton LLP

(57) ABSTRACT

A method may include receiving a first event notification including a key, received via a first stream of a streaming event platform. The method may include generating a record of the first event notification in a database including a correlation ID and the key. The method may include generating an event indicating an alarm notification, based on the first event notification in a second stream. The method may include receiving a second event notification including the key, received via the first stream. The method may include generating a record of the second event notification in the database including the correlation ID and the key. The method may include determining that the second event notification is related to the first event notification based on the correlation ID and the key. The method may include generating an event indicating an update notification based on the second event notification in the second stream.

20 Claims, 8 Drawing Sheets

METHOD AND SYSTEM FOR DETERMINING ACTIVE EVENTS IN A 5G NETWORK

BACKGROUND

Modern networks and systems include many different components working in concert to provide services. When a component fails, responsible entities and other stakeholders need to be notified. An event may be posted in an event stream, indicating issues with the components as they occur. After the initial event is posted, one or more updates may be posted to the event stream. The number of components, stakeholders, issues, and updates for large systems may create an inefficient log of some or all of the issues experienced within a network, leading to difficulties in identifying active problems and/or the status of a given problem.

BRIEF SUMMARY

A method may include receiving, by a computing system, a first event notification including a key. The first event notification may be received via a first stream of a streaming event platform. The method may include generating, by the computing system, a record of the first event notification in a database, the record of the first event notification including a correlation identifier (ID) and the key. The method may include generating, by the computing system, an event based on the first event notification in a second stream of the streaming event platform, the event indicating an alarm notification. The method may include receiving, by the computing system, a second event notification including the key, the second event notification received via the first stream of the streaming event platform. The method may include generating, by the computing system, a record of the second event notification in the database, the record of the second event notification including the correlation ID and the key. The method may include determining, by the computing system, that the second event notification is related to the first event notification based at least in part on the correlation id and the key. The method may include generating, by the computing system, an event indicating an update notification based on the second event notification in the second stream of the streaming event platform.

In some embodiments, updating the second stream of the streaming event platform may include receiving, by the computing system, a third event notification including the key, the third event notification received via the first stream of the streaming event platform. The method may also include updating, by the computing system, the second stream of the streaming event platform to remove the event indicating the alarm notification and the event indicating the update notification, based at least in part on the third event notification and/or a time-based trigger. The third event notification may indicate that an active alarm associated with the alarm notification has been resolved. The first event notification may include an active alarm corresponding to a network component. The network component may be a component of an open radio access network of a 5G wireless network provider. The first stream of the streaming event platform may include events associated with an entity associated with a network component. The second stream of the streaming event platform may include active alarm notifications associated with one or more entities associated with respective network components. In some embodiments, the method may include transmitting, by the computing system and to a user device, data associated with at least one of the first event notification and the second event notification. The data may include instructions directing the user device to display a most-recent event notification.

A system may include one or more processors and a non-transitory computer-readable medium may include instructions that, when executed by the one or more processors, cause the system to perform operations. According to the operations, the system may receive a first event notification including a key, the first event notification received via a first stream of a streaming event platform. The system may generate a record of the first event notification in a database, the record of the first event notification may include a correlation identifier (ID) and the key. The system may generate an event based on the first event notification in a second stream of the streaming event platform, the event indicating an alarm notification, The system may receive a second event notification including the key, the second event notification received via the first stream of the streaming event platform. The system may generate a record of the second event notification in the database, the record of the second event notification may include the correlation ID and the key. The system may determine that the second event notification is related to the first event notification based at least in part on the correlation ID and the key. The system may generate an event indicating an update notification based on the second event notification in the second stream of the streaming event platform.

In some embodiments, the first event notification may include an active alarm corresponding to a network component. A third event notification may indicate that the active alarm corresponding to the network component has been cleared. The network component may be a component of an open radio access network of a 5G wireless network provider. The first stream of the streaming event platform may include event notifications associated with an entity associated with a network component. The second stream of the streaming event platform may include active alarm notifications associated with one or more entities associated with respective network components. In some embodiments, the system may transmit, to a user device, data associated with at least one of the first event notification and the second event notification, the data used by the user device to display a most-recent event notification.

A non-transitory computer-readable medium may include instructions that, when executed by one or more processors, cause the one or more processors to perform operations. The operations may include receiving, by a computing system, a first event notification including a key. The first event notification may be received via a first stream of a streaming event platform. The operations may include generating, by the computing system, a record of the first event notification in a database, the record of the first event notification including a correlation identifier (ID) and the key. The operations may include generating, by the computing system, an event based on the first event notification in a second stream of the streaming event platform, the event indicating an alarm notification. The operations may include receiving, by the computing system, a second event notification including the key, the second event notification received via the first stream of the streaming event platform. The operations may include generating, by the computing system, a record of the second event notification in the database, the record of the second event notification including the correlation ID and the key. The operations may include determining, by the computing system, that the second event notification is related to the first event notification based at least in part on the correlation id and the key. The operations may include generating, by the computing system, an event indicating an update notification based on the second event notification in the second stream of the streaming event platform.

In some embodiments, updating the second stream of the streaming event platform may include: receiving, by the computing system, a third event notification including the key, the third event notification received via the first stream of the streaming event platform. The operations may then include updating, by the computing system, the second stream of the streaming event platform to remove the event indicating the alarm notification and the event indicating the update notification, based at least in part on the third event notification and/or a time-based trigger. The third event notification may indicate that an active alarm associated with the alarm notification has been resolved. The first event notification may include an active alarm corresponding to a network component. The network component may be a component of an open radio access network of a 5G wireless network provider.

DETAILED DESCRIPTION

Figure 1:
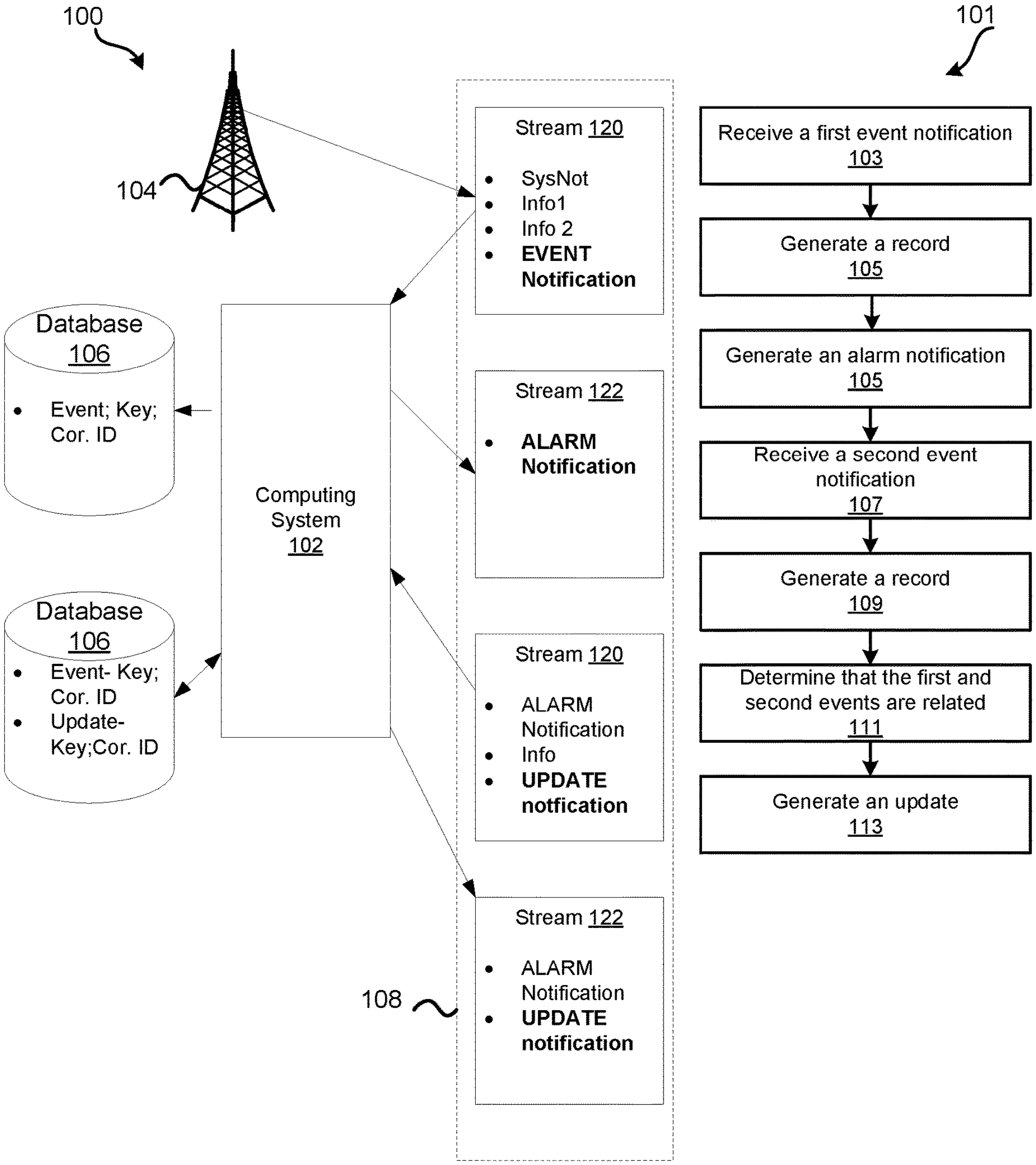
FIG. 1 illustrates a system and a process for efficiently managing component failures, according to certain embodiments.

Complex systems such as cellular wireless network may include several components, located in various different locations, performing functions that may be necessary to provide cellular service to users. In some cases, a wireless network provider may maintain all of the varying components of the cellular wireless network. In other cases, various entities may maintain and repair some or all of the components. The components may include various pieces of hardware and/or software. Furthermore, the components may be in one of several physical or virtual locations and be administered by one or more entities. For example, a cellular network tower may have several pieces of hardware at the site of the tower, such as a radio unit (RU), various servers, and other devices. Some or all of the devices may also include software components. Other components may be hosted in a cloud based environment, such as a charging function (CHF), a radio link control (RLC) of a radio access network, and other functions. When a component fails, various entities may need to be notified as efficiently as possible in order to resolve the issues.

One way of providing information to the various entities may be a streaming event platform. The streaming event platform may receive entries corresponding to various events in one or more streams or threads. For example, a thread may include events corresponding to the failure of various components of a cellular wireless network in a given region. If a component fails, an alarm event may be created in the thread. The entity associated with the failed component may subscribe to the thread, being notified whenever a new event is provided to the thread. In response to the alarm event, the entity may evaluate the component, repair or replace the component, and then indicate that the alarm event (i.e., the component failure) has been resolved.

In simple networks, where only one or two entities may be responsible for all of the components of a network, the system described above may be sufficient to notify the responsible entities of any component failures. Modern wireless networks, however, may have many entities. Thus, the thread may include a large number of events, with new events being created in the thread frequently. Active alarm events (e.g., unresolved events) may therefore go unnoticed by an entity and/or cause delays in finding information about specific alarm events. One solution may be to provide a thread associated with each entity, each thread containing only those events associated with a respective entity. However, with a wireless network spanning several regions, with several entities responsible for various components therein, managing the number of threads needed for each of the entities may be cost prohibitive, data intensive, and require significant computing power.

Another solution may be to monitor a first thread, where a constant stream of events associated with one or more entities is provided. When an active alarm associated with a component failure, is identified, a record of the alarm may be created in a database. An event may then be created in a second thread, where the event includes the active alarm and various data associated with the alarm. When the entity responsible for the failed component may generate an update event in the first stream. Using keys in the alarm event and the update event, the update event may be identified as being related to the alarm event. The update event may be logged in the database, and an update event created in the second thread. When the component failure is resolved, the alarm event and the update event may be removed from the second thread. In effect, the second thread may only contain active alarms and related events. The first thread, by contrast, may include a historical record of alarms and events, even if the historical alarm has been resolved. Component failures may therefore be more efficiently identified while still maintaining a record of all of the failures a network has experienced. Although the description and figures described herein are described in relation to wireless networks, it should be understood that the systems and techniques may be applied to many different industries and types of event streams.

FIG. 1 illustrates a system 100 and a process 101 for efficiently managing component failures, according to certain embodiments. The system 100 may include a computing system 102, wireless network infrastructure 104, a database 106, and a streaming event platform 108. The computing system 102 may include any number of components, both hardware and software. For example, the computing system 102 may include one or more physical machines and/or one or more virtual compute instances in a cloud-based system. The computing system 102 may be associated with a wireless network provider. The wireless network provider may provide cellular service to one or more users. The cellular service may be a 5G wireless service and be implemented on a distributed, cloud-based architecture. The 5G wireless service may include an open radio access network (O-RAN). As such, the wireless network infrastructure 104 may include various network components located at a tower site (e.g., RUs, servers, computers, and other such equipment) and various network components implemented by compute instances within the cloud-based architecture. The network components implemented by compute instances may include network functions, such as an CHF, an SMF, an AMF, and/or other such network functions. The network components implemented by compute instances may also include one or more third-party software components, configured to perform functions for the wireless network provider.

The database 106 may be a relational database, The database 106 may include one or more records of historical events such as alarm notifications, updates related thereto, and other information associated with the historical events. In some embodiments, the database 106 may be accessed only by the wireless network provider. In other embodiments, the database 106 may be accessed by entities associated with the network components.

The streaming even platform 108 may be implemented by the computing system 102, or may be implemented by some other computing system (e.g., a physical machine(s) and/or virtual computers). The streaming event platform 108 may include one or more streams or threads, each thread including events received from the various network components of the wireless network infrastructure 104. The streaming event platform 108 may include a stream for respective regions administered by the wireless network provider (e.g., regions where the wireless network provider provides cellular service). Additionally or alternatively, the streaming event platform 108 may include a stream 120 including alarm events associated with failed network components and related events. In the example shown in FIG. 1, the stream 120 may include events such as a system notification, information 1 and 2, etc. Each of the events posted to the stream 120 (and/or any stream of the streaming events platform 108) may include a timestamp indicating a time at which the event was posted to the stream 120. The streaming event platform 108 may store records of every event in the stream 120 for a given period of time and/or data size. For example, the stream 120 may receive a high volume of events posted to the stream 120 and store the events for a matter of days, weeks, etc. Thus, when an entity responsible for a failed network component attempts to locate events associated with a particular event, there may be a large number of events to parse, leading to inefficiencies.

To address this issue, the streaming event platform 108 may also include a stream 122. The stream 122 may include only those events associated with an alarm event that has not been remedied. Unlike the stream 120, the stream 122 may store the events posted to the stream 122 only until an indication that the alarm event is no longer active (e.g., the component failure has been addressed and/or remedied). Thus a user may more easily and efficiently locate information associated with an active alarm by subscribing to the stream 122 instead of or in addition to the stream 120.

In the example shown in FIG. 1, a network component may fail. The failed network component may be associated with the wireless network infrastructure 104. An entity responsible for the failed network component may post an alarm notification (i.e., one example of an event) to the stream 120, and/or the failed component and/or some other network component may post the alarm notification to the stream 120. The alarm notification may include a key for identifying the alarm notification and/or the failed component, data about the failed network component and associated entity, network data (e.g., network statistics), or other data associated with the wireless network.

At step 103, the computing system 102 may identify the alarm notification in the stream 120. The computing system 102 may passively receive all events posted to the stream 120 in real-time, and discard events that are not related to an alarm of some sort. Additionally or alternatively, the computing system 102 may scan the stream 120 periodically and identify new alarm notifications and/or events related to alarms.

At step 105, the computing system 102 may generate a record of the alarm notification in the database 106. The record of the alarm notification may include a timestamp, the key for identifying the alarm notification and/or the failed component, the data about the failed network component and associated entity, the network data (e.g., network statistics), and/or other data associated with the wireless network. The record may be stored as an event within the database 106, as shown in FIG. 1. The record may also include a correlation identifier (corr. ID). The corr. ID may be used to link the record of the alarm notification with subsequent records created from other events. The corr. ID may function as a foreign key for a relational database implemented in the database 106.

As part of generating the record, the computing system 102 may scan the database 106 for any historical records with the same key and/or corr. ID. If a historical record with a corresponding key and/or corr. ID is identified, the computing system 102 may cause the record to be associated with the historical record. If not corresponding key and/or corr. ID is identified, the record may not be associated with any historical record.

At step 107, the computing system may generate a post including the alarm notification within the stream 122. In the example shown in FIG. 1, the stream 122 includes only the alarm notification. In some examples, this may mean that the alarm notification is the first alarm notification received by the computing system 102. In other examples, other events corresponding to other alarms (and therefore other failures within the network) may have been removed from the stream 122 (e.g., due to the other failures being resolved).

At step 107, the computing system 102 may receive a second event notification, indicating an update notification. The update notification may include a timestamp, the key for identifying the alarm notification and/or the failed component, the data about the failed network component and associated entity, the network data (e.g., network statistics), and/or other data associated with the wireless network. As shown in FIG. 1, other information may have been posted to the stream 120 between receiving the alarm notification and the update notification. The information may not be associated with any alarm notification, and therefore may be ignored by the computing system 102. The computing system 102 may identify the update notification as being related to an alarm notification based on some or all of the information included in the update notification. For example, the entity responsible for the failed network component may have received information about the failure (e.g., from a technician, diagnostics, etc.) and/or resolved the issue with the failed component. The update notification may therefore be posted to the stream 120 by the entity, the failed component, other network components, or other relevant parties.

At step 109, in response to identifying that the update notification is related to an alarm notification, the computing system 102 may cause a record of the update notification to be generated in the database 106. The record of the update notification may include a timestamp, the key for identifying the alarm notification and/or the failed component, the data about the failed network component and associated entity, the network data (e.g., network statistics), and/or other data associated with the wireless network.

At step 111 Based on at least some of this information, the computing system may identify that the update notification is related to the record of the alarm notification stored on the database 106. The computing system 102 may therefore assign an identical corr. ID to the record of the update notification. In some embodiments, the computing system 102 may cause the record of the alarm notification to be updated (e.g., indicating that the record of the alarm notification is not the latest event associated with the alarm notification).

At step 113, the computing system 102 may generate a post of the update notification to the stream 122. In the example shown in FIG. 1, the update notification may appear later in the stream than the alarm notification. The computing system 102 may generate the post of the update notification based at least in part on the timestamp. Thus, the stream 122 may represent a chronological log of events associated with the alarm notification.

Although FIG. 1 only shown one alarm notification and one update notification, it should be understood that any number of alarms notifications (and related update notifications) may be posted to the stream 120 and 122. Thus, the stream 122 may represent a chronological log of alarm notifications and events related thereto.

In some embodiments, the computing system 102 may not access the stream 120 directly to identify alarm notifications and related updates. Instead, records of all events may be created in the database 106 (by the computing system 102 or some other system). The computing system 102 may then identify all alarm notifications and update notifications (collectively, sometimes “the events”) in the database 106 that have not been resolved. The computing system 102 may then post the events in the stream 122 in chronological order based at least in part on the timestamp included in each event. The computing system 102 may scan the database 106 and post events to the stream 122 according to a predetermined schedule (e.g., every 5 seconds, every 10 seconds, etc.).

Figure 2:
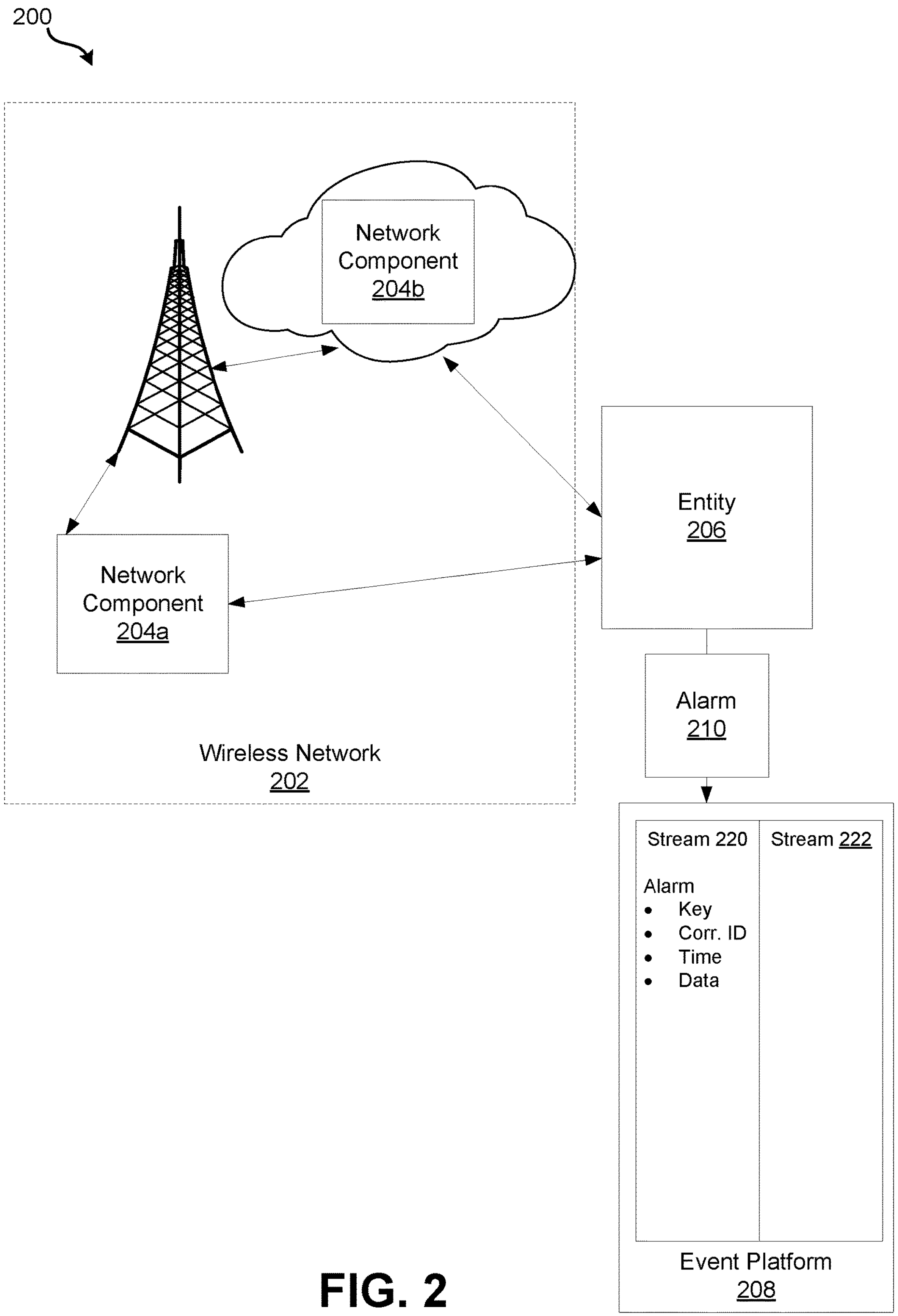
FIG. 2 illustrates a system for posting an alarm notification to an event platform 208, according to certain embodiments.

FIG. 2 illustrates a system 200 for posting an alarm notification 210 to an event platform 208, according to certain embodiments. The system 200 may be similar to some or all of the system 100 in FIG. 1, and configured to perform some or all of the steps of the process 101. As such, the system 200 may include a wireless network 202, including network components 204*a-b*, an entity 206 associated with at least one of the network components 204*a-b*, and the event platform 208. The event platform 208 may be a streaming event platform (e.g., the streaming event platform 108 in FIG. 1) associated with a wireless network provider. The event platform 208 may include streams 220 and 222. The streams 220 and 222 may be similar to the stream 120 and 122.

The wireless network 202 may be a cellular network, such as a 5G network implemented with an O-RAN. As such, the network components 204*a-b* may be distributed, located in different locations and/or in a cloud-based architecture. For example, the network component 204*a* may be implemented at a cell tower site of the wireless network 202. The network component 204*a* may be a server or other computing device, an RU, or any other localized network component of wireless network 202. The network component 204*b* may be implemented in a cloud-based architecture (e.g., hosted by a publicly available cloud service). The network component 204*b* may be a network function associated with a cellular network (e.g., a CHF, SMF, AMF, etc.). The network component 204*b* may additionally or alternatively include a third-party software application configured to administer one or more network functions.

The entity 206 may be associated with one or both of the network components 204*a-b*. In either case, the entity 206 may detect a failure of one of the network components 204*a-b*. The entity 206 may then generate an alarm notification 210. The alarm notification 210 may include information such as a timestamp, a key for identifying the alarm notification 210 and/or the failed component 204*a* and/or 204*b*, data about the failed network component 204*a* and/or 204*b* and the entity 206, network data (e.g., network statistics) associated with the wireless network 202, and/or other data associated with the wireless network 202. The entity 206 may then post the alarm notification to the stream 220 of the event platform 208. The post in the stream 220 may include some or all of the information included in the alarm notification 210. In some embodiments, the information may include a corr. ID (as shown in FIG. 2).

In some embodiments, the failed network component 204*a* and/or 204*b* may generate the alarm notification 210 and transmit the alarm notification to the entity 206. Additionally or alternatively, the failed network component 204*a* and/or 204*b* may generate the alarm notification 210 and post the alarm notification 210 to the stream 220 of the event platform 208.

Figure 3:
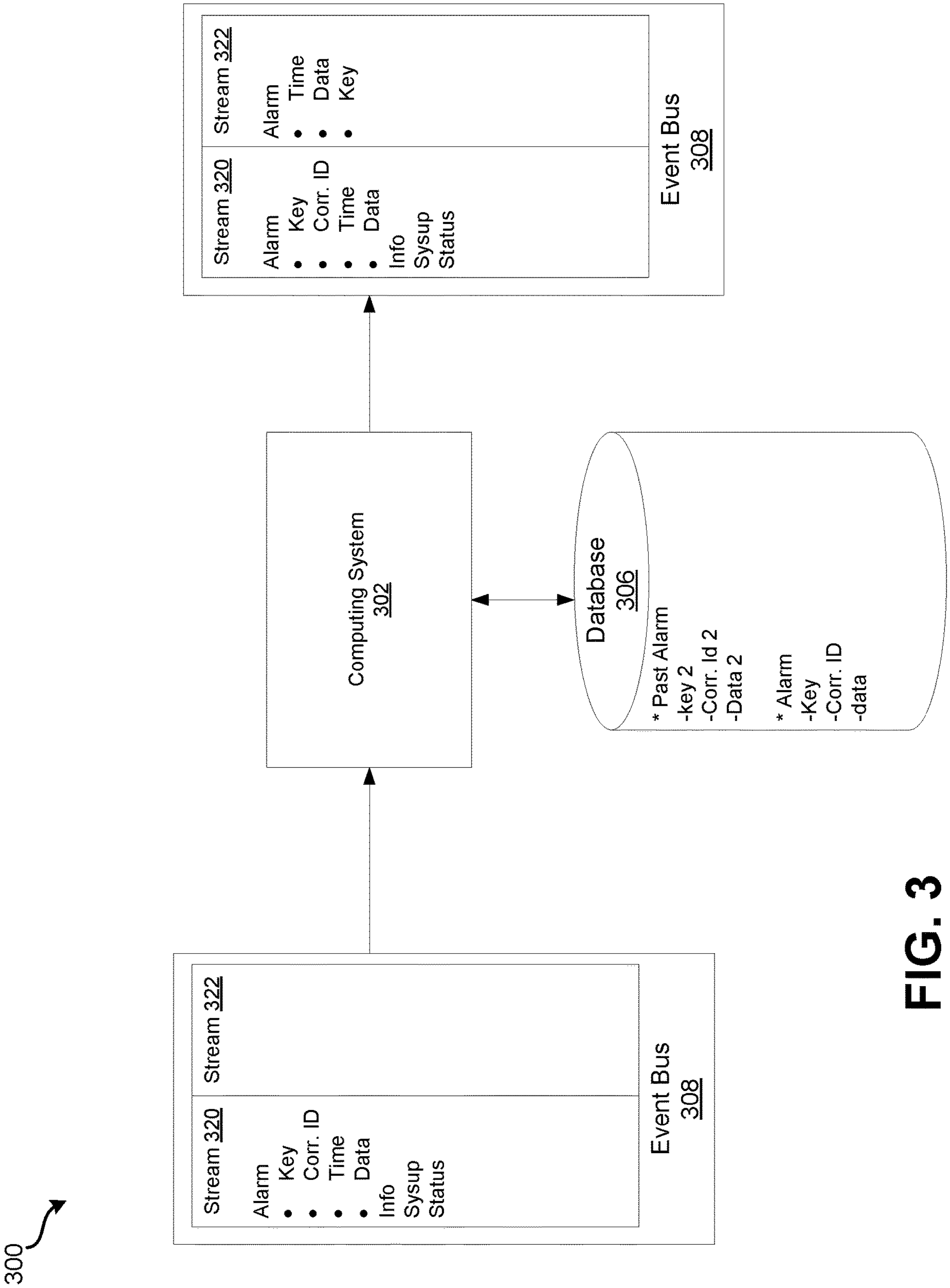
FIG. 3 illustrates a system for generating a record of an alarm notification in a database 306, according to certain embodiments.

FIG. 3 illustrates a system 300 for generating a record of an alarm notification in a database 306, according to certain embodiments. The system 300 may be similar to some or all of the system 100 in FIG. 1. The system 300 may work in conjunction with the system 200 in FIG. 2. Thus the system 300 may include similar components and functionalities. The system 300 may include a computing system 302 (e.g., the computing system 102), an event platform 308 (e.g., the event platform 308), and a database 306 (e.g., the database 106).

The event platform 308 may include streams 320 and 322. The stream 320 may include events provided by one or more entities (e.g., the entity 206) and/or network components (e.g., the network components 204*a-b*). As shown in FIG. 3, the stream 320 may include the alarm notification as described in FIG. 2, and including the key, the timestamp, data about a failed component (and/or a wireless provider), and/or a corr. ID. The stream 320 may also include other events not related to the alarm notification, such as system information updates, system status notifications, and other events.

The computing system 302 may identify the alarm notification in the stream 320. The computing system 302 may generate a record in the database 306. The record may include information such as the key associated with the alarm notification, the data about a failed component (and/or a wireless provider), and/or a corr. ID. The corr. ID may be generated by the computing system 302 and/or the database 306. The database 306 may include records of past alarms. The records of the past alarms may include keys associated with the past alarm, corr. IDs associated with the past alarm, and data associated with the past alarm. The computing system 302 may scan the database 306 to determine if the record of the alarm is related to any of the past alarms. To do this, the computing system 302 may compare one or more of the keys, corr. IDs, and/or the data associated with the various alarms.

In response to determining that the record of the alarm is not related to any past historical alarms, the computing system 302 may post an event to the stream 322 of the event platform 308 indicating the alarm notification. The event may include the timestamp associated with the alarm notification, the key associated with the alarm notification, data about the failed component (and/or a wireless provider). The stream 322 may therefore only include the event associated with the alarm notification. In other words, the stream 322 may only include events of active alarms (e.g., alarms that have not been resolved).

Figure 4:
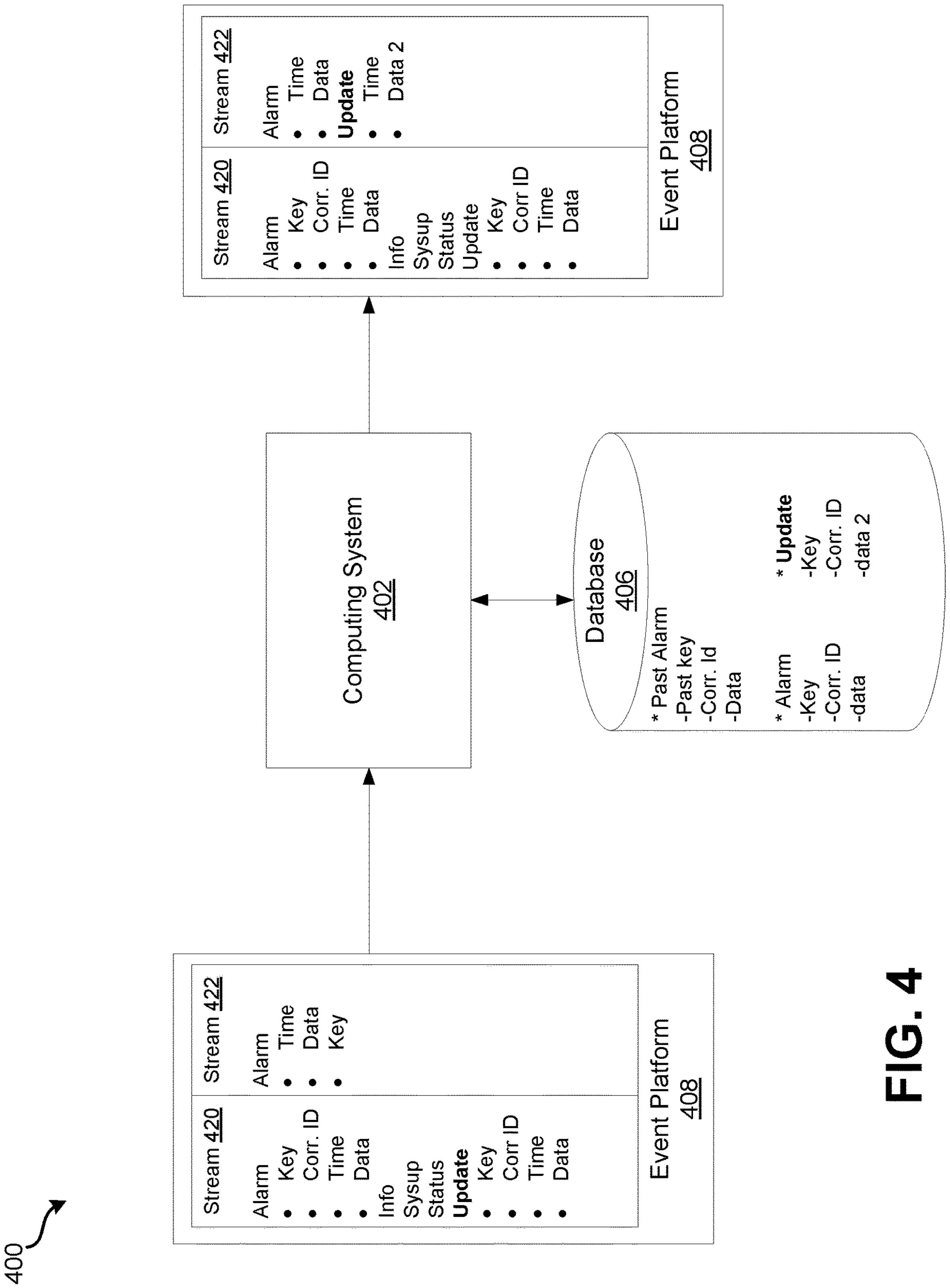
FIG. 4 illustrates a system for providing an update to a stream of an event platform, according to certain embodiments.

FIG. 4 illustrates a system 400 for providing an update to a stream 422 of an event platform, according to certain embodiments. The system 400 may be similar to some or all of the system 100 in FIG. 1. The system 400 may work in conjunction with the systems 200 and 300 in FIGS. 2 and 3, respectively. Thus the system 400 may include similar components and functionalities. The system 400 may include a computing system 402 (e.g., the computing system 102), an event platform 408 (e.g., the event platform 408), and a database 406 (e.g., the database 106).

The event platform 408 may include streams 420 and 422. The stream 420 may include events provided by one or more entities (e.g., the entity 206) and/or network components (e.g., the network components 204*a-b*). As shown in FIG. 4, the stream 420 may include the alarm notification as described in FIG. 3, and including the key, the timestamp, data about the failed component (and/or a wireless provider), and/or a corr. ID. The stream 420 may also include other events not related to the alarm notification, such as system information updates, system status notifications, and other events.

The stream 420 may also include an event indicating an update notification. The update notification may include the key, a timestamp, data about the failed component (and/or a wireless provider), and/or a corr. ID. The data may be generated by the entity associated with the failed network component. For example, the entity may receive an update about the failed network component (e.g., from a technician, diagnostic tool). The update notification may be provided to the stream 420 of the event platform 408 by the entity associated with the failed network component and/or the failed network component. The stream 422 may include the event associated with the alarm notification, posted to the stream 322 by FIG. 302 in FIG. 3 (e.g., the alarm notification is still an active alarm).

The computing system, 402 may identify and receive the update notification from the stream 420. The computing system 402 may then generate a record of the update notification in the database 406. The record of the update notification may include the key, the timestamp, data about the failed component (and/or a wireless provider), and/or the corr. ID. In some embodiments, the corr. ID may be provided in the alarm notification. In other embodiments, the corr. ID may be generated and associated with the record of the update notification by the computing system 402. The computing system 402 may scan the database 406 in order to determine if the update notification is associated with one or more other records in the database 406. To do so, the computing system 402 may compare the key of the update notification to the keys associated with other records included in the database 406. The computing system 402 may additionally or alternatively compare the corr. ID of the record of the update notification to corr. IDs of other records within the database 406.

Upon determining that at least one of the key, the corr. ID, and the data are correlated with the record of the alarm notification, the computing system 402 may correlate the record of the update notification to the record of the alarm notification. The computing system 402 may then post an event indicating the update notification in the stream 422. The event indicating the update notification in the stream 422 may include the timestamp associated with the update notification, data associated with the update notification, etc. The timestamp associated with the update notification may indicate a later time than the timestamp associated with the alarm notification. Thus, the stream 422 may represent a chronological log of events associated with the alarm notification.

In some embodiments, the update notification may indicate that the failed network component has been repaired or otherwise addressed. In other words, the update notification may indicate that the alarm has been resolved and is no longer an active alarm. Then, the computing system 402 may cause the alarm notification and any related update notifications to be removed from the stream 422 of the event platform 408. Thus, the stream 422 may include only active alarms and related updates. In some embodiments, the update notification indication that the alarm has been resolved may be posted as an event in the stream 422. The computing system 402 may then clear any alarm events and related update events on a rolling basis (e.g., every two weeks).

Figure 5:
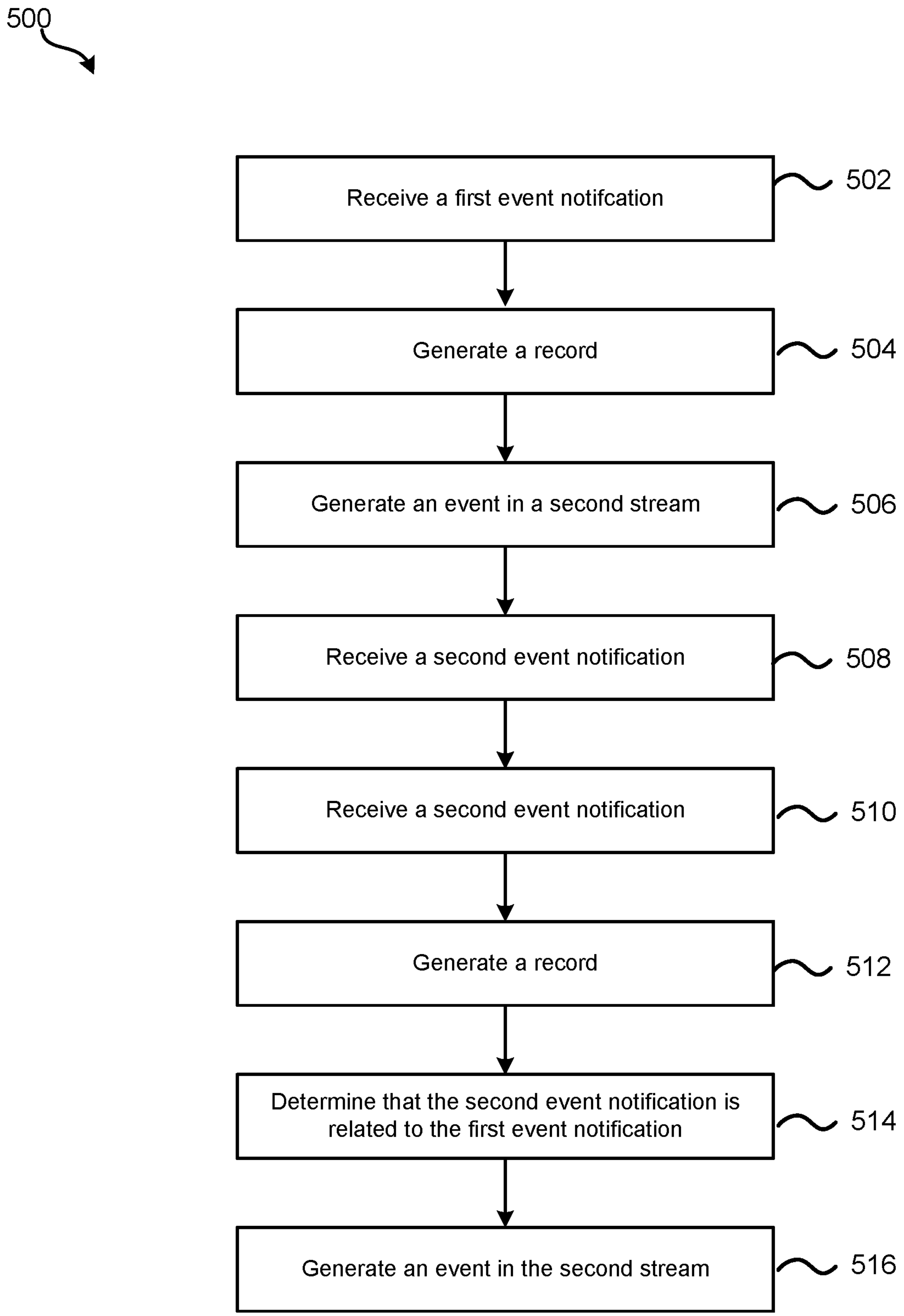
FIG. 5 illustrates a flowchart of a method for providing a stream including active alarms and related updates, according to certain embodiments.

FIG. 5 illustrates a flowchart of a method 500 for providing a stream including active alarms and related updates, according to certain embodiments. The method 500 may be performed by some or all of the system described herein, such as the systems 100-400 in FIGS. 1-4, respectively. Some of the steps of the method 500 may be combined with other steps, performed in a different order, and in some embodiments, skipped altogether.

At step 502, the method 500 may include receiving, by a computing system, a first event notification. The first event notification may include a key, associated with a network component of a wireless network and/or an entity associated therewith. The first event notification may be received via a first stream of a streaming event platform. The streaming event platform may include one or more streams, each stream including events received from various network components of the wireless network. The streaming event platform may include a stream for respective regions administered by the wireless network provider (e.g., regions where the wireless network provider provides cellular service). Additionally or alternatively, the first stream may include alarm events associated with failed network components and related events from one or more regions and/or sites associated with a wireless network provider. Thus, the computing device may determine that the first event notification is an alarm notification.

The wireless network provider may provide a 5G wireless network via an O-RAN. The 5G wireless network may be implemented on a distributed cloud-based architecture. As described in relation to FIG. 1, the various network components may include software or hardware, located in various places and/or hosted on compute instances of a cloud provider.

At step 504, the method 500 may include generating, by the computing system, a record of the first event notification in a database. The record of the first event notification may include a correlation identifier (ID) and the key. In some embodiments, the corr. ID may be included in the alarm notification. In other embodiments, the corr. ID may be generated by the computing device and associated with the record of the first event notification. The corr. ID may be used as a foreign key or a relational database, such as the database 306 in FIG. 3. The record of the first event notification may also include a timestamp, indicating a time the first event notification was posted to the first stream.

At step 506, the method 500 may include generating, by the computing system, an event in a second stream of the streaming event platform. The event may indicate an alarm notification (e.g., a notification that a network component of the wireless network has failed). The second stream may include event such as active alarms associated with various network components, one or more entities associated with the various network components, and updates associated with the active alarms. The events may therefore be associated with the failed component and/or an entity associated with the failed component.

At step 508, the method 500 may include receiving, by the computing system, a second event notification. The second event notification may include the key and be received via the first stream of the streaming event platform. The second event notification may include an update notification. For example, the entity associated with the failed network component may receive more information about the cause of the failure, a potential solution, and/or provide a status update (e.g., expected uptime). In some embodiments, the second event notification may indicate that the failed component has been repaired or otherwise dealt with such that the alarm notification is no longer active.

At step 510, the method 500 may include generating, by the computing system, a record of the second event notification in the database. The record of the second event notification may include a timestamp indicating a time that the second event notification was posted in the first stream. The record of the second event notification may also include a corr. ID and the key. The computing system may scan the database to identify any records within the database that include the key and/or the corr. ID. In some embodiments, the corr. ID may be generated by the computing system and attached to the record of the second event notification after finding a record that shares the same key, such as the record of the first event notification. Thus, the corr. ID may be the same between the records of the first and second event notifications.

At step 512, the method 500 may include determining, by the computing system, that the second event notification is related to the first event notification based at least in part on the corr. ID and the key. In response, the computing system may associate the first and second event notifications. The computing system may also compare the timestamps associated with each of the first and second event notifications. The computing system may thereby determine that the second event notification was posted to the first stream after the first event notification.

At step 514, the method 500 may include generating, by the computing system, an event indicating the update notification in the second stream of the streaming event platform. The event indicating the update notification may include a status of the failed component, an expected uptime, and other such information. The event indicating the update notification may be posted to the second stream based at least in part on the timestamp of the second event notification. Because the timestamp associated with the second event notification may indicate a later time than the timestamp associated with the first event notification, the event notification may be posted to the second stream such that a chronological log of events associated with the alarm notification is created within the second stream.

In some embodiments, the method 500 may also include receiving, by the computing system, a third event notification including the key. The third event notification may be received via the first stream of the streaming event platform. The method 500 may also include updating, by the computing system, the second stream of the streaming event platform to remove the alarm notification and the update notification, based at least in part on the third event notification and/or a time-based trigger. For example, the third event notification may indicate that the failed component has been repaired or otherwise dealt with. The alarm notification may therefore be considered resolved, or no longer active. The computing system may then remove any events corresponding to the alarm notification (i.e., the first event notification) from the second stream. The second stream may thus only include active alarms and updates thereto.

In some embodiments, the computing system may transmit data associated with at least one of the first event notification and the second event notification to a user device. The data may include instructions directing the user device to display a most-recent event notification. The most-recent event notification may be determined by the computing system based on the timestamps associated with each event notification.

Figure 6A:
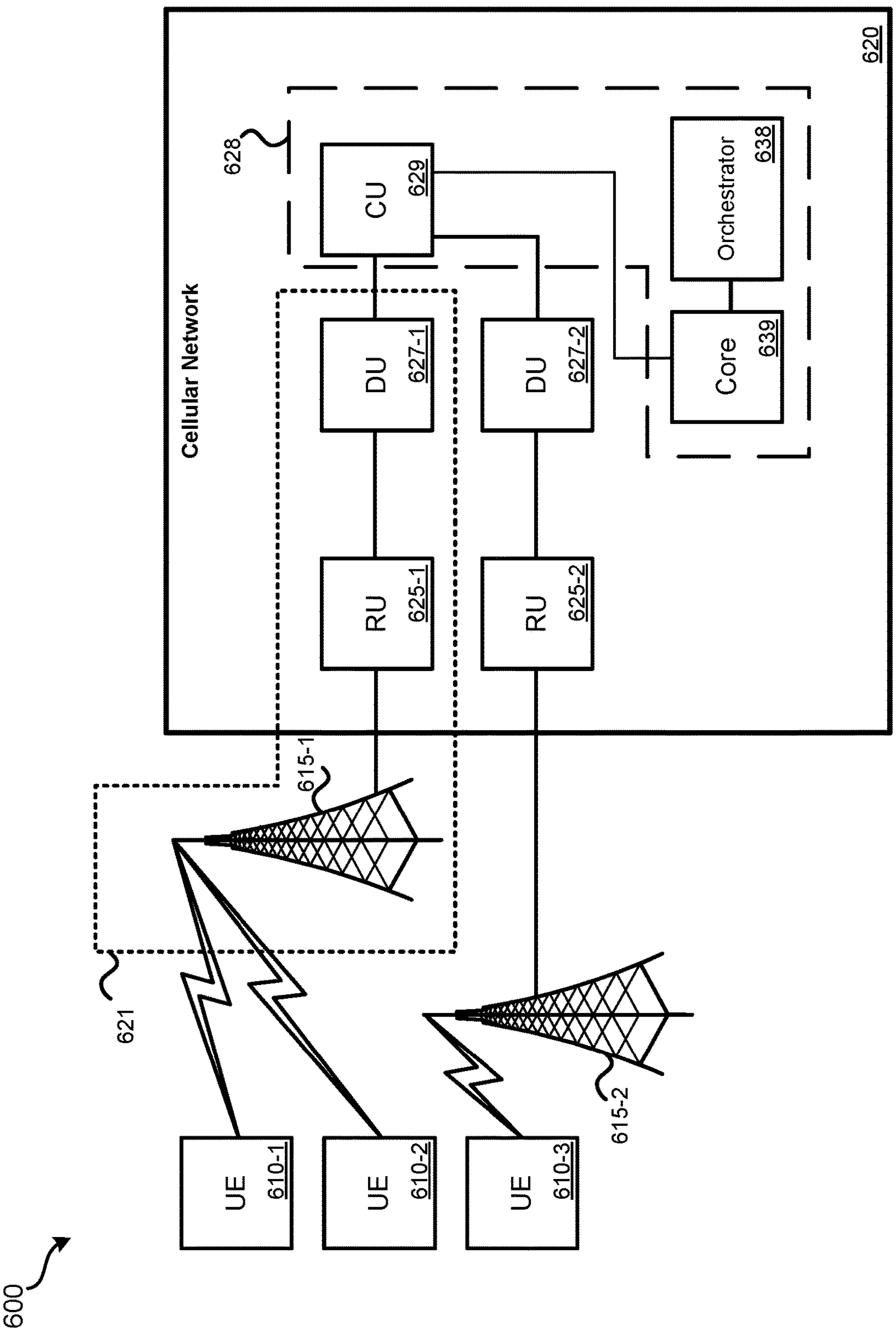
FIG. 6A illustrates an embodiment of a cellular network system, according to certain embodiments.

FIG. 6A illustrates an embodiment of a cellular network system 600 ("system 600"), according to certain embodiments. System 600 can include a fifth generation (5G) New Radio (NR) cellular network; other types of cellular networks, such as fourth generation (4G) long-term evolution (LTE) cellular network, sixth generation (6G) cellular network, seventh generation (7G) cellular network, etc. are also possible. System 600 can include: UE 610 (UE 610-1, UE 610-2, UE 610-3); base station 615; cellular network 620; radio units 625 ("RUs 625"); distributed units 627 ("DUs 627"); centralized unit 629 ("CU 629"); core 639, and orchestrator 638. FIG. 6A represents a component level view. In a virtualized open radio access network (O-RAN), because components can be implemented as software in the cloud, except for components that receive and transmit RF, the functionality of various components can be shifted among different servers, for which the hardware may be maintained by a separate (e.g., public) cloud-service provider, to accommodate where the functionality of such components is needed, such as detailed in relation to FIG. 7.

UE 610 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a cellular (e.g., 5G) interface, such as a 5G modem. Examples include sensor devices, Internet of Things (IoT) devices, manufacturing robots; unmanned aerial (or land-based) vehicles, network-connected vehicles, environmental sensors, etc. UE 610 may use RF to communicate with various base stations of cellular network 620. Two base stations 615 (BS 615-1, 615-2) are illustrated. Real-world implementations of system 600 can include many (e.g., hundreds, thousands) base stations, and many RUs, DUs, and CUs. BS 615 can include one or more antennas that allow RUs 625 to communicate wirelessly with UEs 610. RUs 625 can represent an edge of cellular network 620 where data is transitioned to wireless communication. In some implementations, the radio access technology (RAT) used by RU 625 is 5G New Radio (NR). Other implementations use other RAT, such as 4G Long Term Evolution (LTE). The remainder of cellular network 620 may be based on an exclusive 5G architecture, a hybrid 4G/5G architecture, a 4G architecture, or some other cellular network architecture. Base station equipment 621 may include an RU (e.g., RU 625-1) and a DU (e.g., DU 627-1) located on site at the base station. In some embodiments, the DU may be physically remote from the RU. For instance, multiple DUs may be housed at a central location and connected to geographically distant (e.g., within a couple of kilometers) RUs.

One or more RUs, such as RU 625-1, may communicate with DU 627-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, "band 71" (a radiofrequency band near 600 Megahertz allocated for cellular communications). One or more DUs, such as DU 627-1, may communicate with CU 629. Collectively, RUs, DUs, and CUs create a gNodeB, which serves as the radio access network (RAN) of cellular network 620. CU 629 can communicate with core 639. The specific architecture of cellular network 620 can vary by embodiment. Edge cloud server systems outside of cellular network 620 may communicate, either directly, via the Internet, or via some other network, with components of cellular network 620. For example, one or more DUs 627-1 may be able to communicate with an edge cloud server system without routing data through CU 629 or core 639.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

Figure 6B:
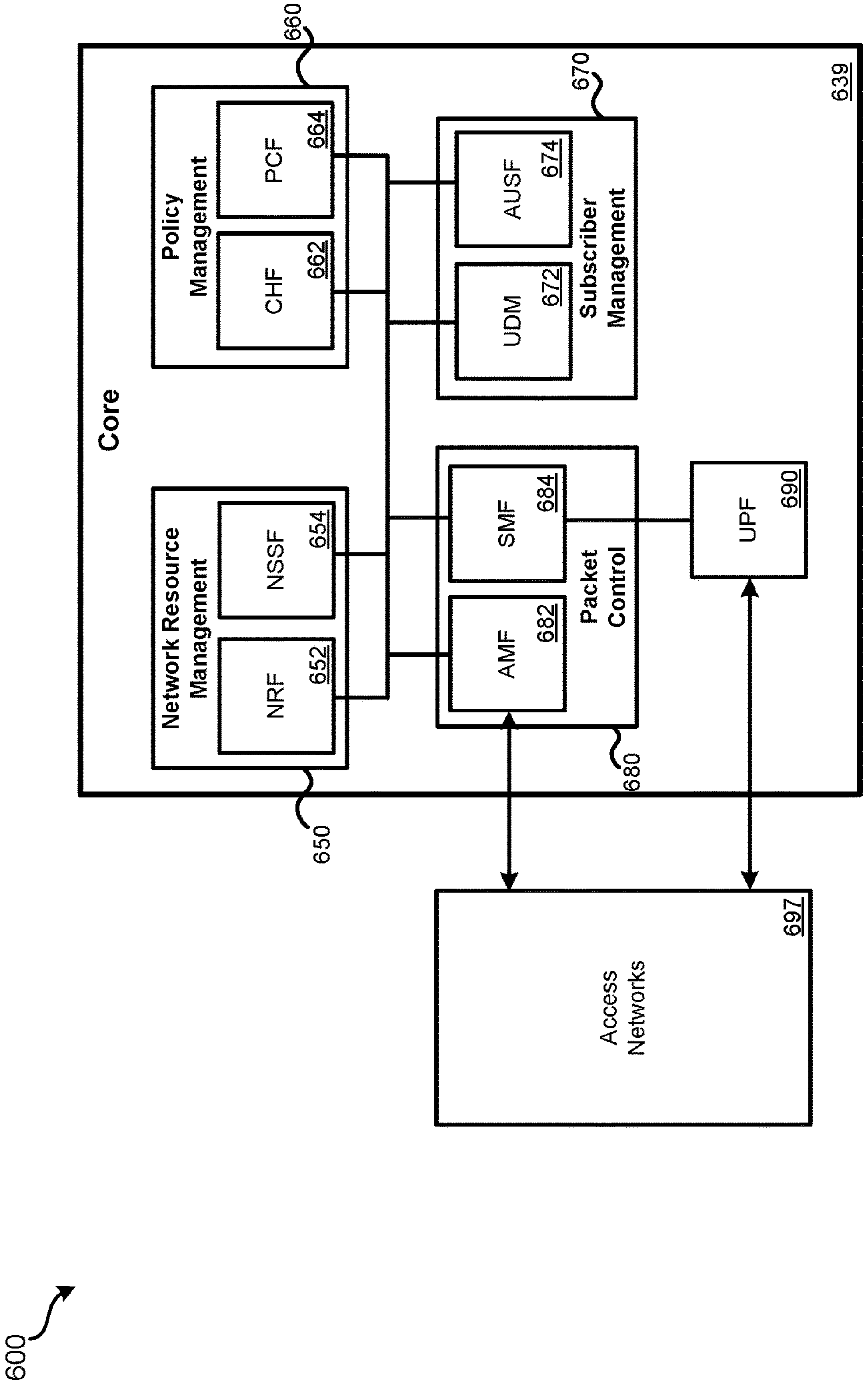
FIG. 6B illustrates an exemplary core, according to certain embodiments.

Further detail regarding exemplary core 639 is provided in relation to FIG. 6B. FIG. 6B illustrates an exemplary core 639, according to certain embodiments. The exemplary core 639 can be physically distributed across data centers or located at a central national data center (NDC), such as detailed in relation to FIG. 7, can perform various core functions of the cellular network. Core 639 can include: network resource management components 650; policy management components 660; subscriber management components 670; and packet control components 680. Individual components may communicate via a bus, thus allowing various components of core 639 to communicate with each other directly. Core 639 is simplified to show some key components. Implementations can involve additional components.

Network resource management components 650 can include: Network Repository Function (NRF) 652 and Network Slice Selection Function (NSSF) 654. NRF 652 can allow 5G network functions (NFs) to register and discover each other via a standards-based application programming interface (API). NSSF 654 can be used by AMF 682 to assist with the selection of a network slice that will serve a particular UE (e.g., UEs 610 of FIG. 6A).

Policy management components 660 can include: Charging Function (CHF) 662 and Policy Control Function (PCF) 664. CHF 662 allows charging services to be offered to authorized network functions. Converged online and offline charging can be supported. PCF 664 allows for policy control functions and the related 5G signaling interfaces to be supported.

Subscriber management components 670 can include: Unified Data Management (UDM) 672 and Authentication Server Function (AUSF) 674. UDM 672 can allow for generation of authentication vectors, user identification handling, NF registration management, and retrieval of UE individual subscription data for slice selection. AUSF 674 performs authentication with UEs.

Packet control components 680 can include: Access and Mobility Management Function (AMF) 682 and Session Management Function (SMF) 684. AMF 682 can receive connection- and session-related information from UEs and is responsible for handling connection and mobility management tasks. SMF 684 is responsible for interacting with the decoupled data plane, creating updating and removing Protocol Data Unit (PDU) sessions, and managing session context with the User Plane Function (UPF).

User plane function (UPF) 690 can be responsible for packet routing and forwarding, packet inspection, quality of service (QOS) handling, and external PDU sessions for interconnecting with a Data Network (DN) (e.g., the Internet) or various access networks 697. Access networks 697 can include the RAN of cellular network 620 of FIG. 6A.

While FIGS. 6A and 6B illustrate various components of cellular network 620, it should be understood that other embodiments of cellular network 620 can vary the arrangement, communication paths, and specific components of cellular network 620. While RU 625 may include specialized radio access componentry to enable wireless communication with UE 610, other components of cellular network 620 may be implemented using either specialized hardware, specialized firmware, and/or specialized software executed on a general-purpose server system. In a virtualized arrangement, specialized software on general-purpose hardware may be used to perform the functions of components such as DU 627, CU 629, and core 639. Functionality of such components can be co-located or located at disparate physical server systems. For example, certain components of core 639 may be co-located with components of CU 629.

Returning to FIG. 6A, some O-RAN implementations of the DUs 627, CU 629, core 639, and/or orchestrator 638 are implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 600, cloud-based cellular network components 628 include CU 629, core 639, and orchestrator 638. In some embodiments, DUs 627 may be partially or fully added to cloud-based cellular network components 628. Such cloud-based cellular network components 628 may be executed as specialized software executed by underlying general-purpose computer servers. Cloud-based cellular network components 628 may be executed on a public third-party cloud-based computing platform or a cloud-based computing platform operated by the same entity that operates the RAN. A cloud-based computing platform may have the ability to devote additional hardware resources to cloud-based cellular network components 628 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits, as needed, for the cellular network 620 to function properly. Kubernetes allows for container deployment, scaling, and management. As an example, if cellular traffic increases substantially in a region, an additional logical DU or components of a DU may be deployed in a data center near where the traffic is occurring without any new hardware being deployed; rather, processing and storage capabilities of the data center would be devoted to the needed functions. When the need for the logical DU or subcomponents of the DU no longer exists (i.e., when traffic subsequently decreases), Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 638. Orchestrator 638 can represent various software processes executed by underlying computer hardware. Orchestrator 638 can monitor cellular network 620 and determine the amount and location at which cellular network functions should be deployed to meet or attempt to meet service level agreements (SLAs) across slices of the cellular network.

Orchestrator 638 can allow for the instantiation of new cloud-based components of cellular network 620. As an example, to instantiate a new DU, orchestrator 638 can perform a pipeline of calling the DU code from a software repository incorporated as part of, or separate from, cellular network 620; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 620. Cellular network 620 is shared with some number of other network slices, such as hundreds or thousands of network slices. Communication bandwidth and computing resources of the underlying physical network can be reserved for individual network slices, thus allowing the individual network slices to reliably meet particular service level agreement (SLA) levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, such allocations also account for resource limitations, such as to avoid allocation of an excess of resources to any particular UE group and/or application. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 625-1 and DU 627-1; and a second set of network slices, which may only partially overlap or may be wholly different from the first set, may be reserved at RU 625-2 and DU 627-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 6A, UE 610 may be operating on one or more production slices of cellular network 620. As detailed later in this document, a UE that functions on a particular entity's local network may be assigned to a slice particular to the entity or a slice that provides a particular QoE for tasks to be performed by the entity's UE.

Components such as DUs 627, CU 629, orchestrator 638, and core 639 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 7:
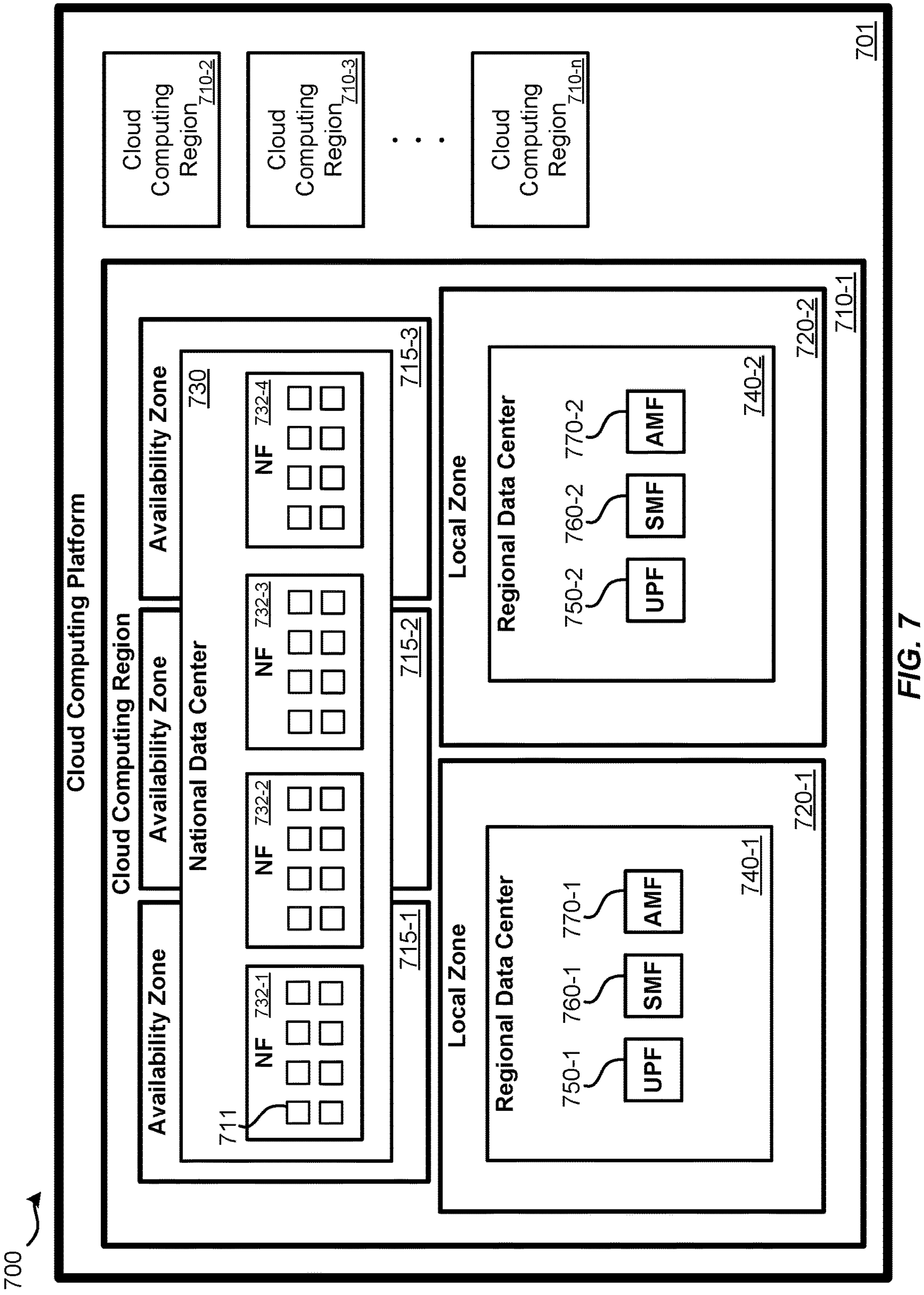
FIG. 7 illustrates an embodiment of a cellular network core network topology as implemented on a public cloud-computing platform, according to certain embodiments.

FIG. 7 illustrates an embodiment of a cellular network core network topology 700 as implemented on a public cloud-computing platform, according to certain embodiments. The cellular network core network topology 700 can be an implementation of the core 639 of FIGS. 6A and/or 6B. Cellular network core network topology 700 can represent how logical cellular network groups are distributed across cloud computing infrastructure of cloud computing platform 701. Cloud computing platform 701 can be logically and physically divided up into various different cloud computing regions 710. Each of cloud computing regions 710 can be isolated from other cloud computing regions to help provide fault tolerance, fail-over, load-balancing, and/or stability and each of cloud computing regions 710 can be composed of multiple availability zones, each of which can be a separate data center located in general proximity to each other (e.g., within 600 miles). Further, each of cloud computing regions 710 may provide superior service to a particular geographic region based on physical proximity. For example, cloud computing region 710-1 may have its datacenters and hardware located in the northeast of the United States while cloud computing region 710-2 may have its datacenters and hardware located in California. For simplicity, the details of the cellular network as executed in only cloud computing region 710-1 is illustrated. Similar components may be executed in other cloud computing regions of cloud computing regions 710 (710-2, 710-3, **710-*n***).

In other embodiments, cloud computing platform 701 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 710 may include multiple availability zones 715. Each of availability zones 715 may be a discrete data center or group of data centers that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 715. For example, a database that is maintained as part of NDC 730 may be replicated across availability zones 715; therefore, if an availability zone of the cloud computing region is unavailable, a copy of the database remains up-to-date and available, thus allowing for continuous or near continuous functionality.

On a (e.g., public) cloud computing platform, cloud computing region 710-1 may include the ability to use a different type of data center or group of data centers, which can be referred to as local zones 720. For instance, a client, such as a provider of the hybrid cloud cellular network, can select from more options of the computing resources that can be reserved at an availability zone 715 compared to a local zone 720. However, a local zone 720 may provide computing resources nearby geographic locations where an availability zone 715 is not available. Therefore, to provide low latency, certain network components, such as regional data centers 740, can be implemented at local zones 720 rather than availability zones 715. In some circumstances, a geographic region can have both a local zone 720 and an availability zone 715.

In the topology of a 5G NR cellular network, 5G core functions of core 639 can logically reside as part of a national data center (NDC) 730. NDC 730 can be understood as having its functionality existing in cloud computing region 710-1 across multiple availability zones 715. At NDC 730, various network functions, such as NFs 732, are executed. For illustrative purposes, each NF 732, whether at NDC 730 or elsewhere located, can be comprised of multiple sub-components, referred to as pods (e.g., pod 711) that are each executed as a separate process by the cloud computing region 710. The illustrated number of pods 711 is merely an example; fewer or greater numbers of pods 711 may be part of the respective 5G core functions. It should be understood that in a real-world implementation, a cellular network core, whether for 5G or some other standard, can include many more network functions. By distributing NFs 732 across availability zones 715, load-balancing, redundancy, and fail-over can be achieved. In local zones 720, multiple regional data centers 740 can be logically present. Each of regional data centers 740 may execute 5G core functions for a different geographic region or group of RAN components. As an example, 5G core components that can be executed within an RDC, such as RDC 740-1, may be: UPFs 750, SMFs 760, and AMFs 770. While instances of UPFs 750 and SMFs 760 may be executed in local zones 720, SMFs 760 may be executed across multiple local zones 720 for redundancy, processing load-balancing, and fail-over.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks. For example, executing instructions stored in the non-transitory computer-readable medium causes the processors to perform steps of methods and/or to implement features of components described herein.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method, comprising:

receiving, by a computing system, a first event notification comprising a key, the first event notification received via a first stream of a streaming event platform;

generating, by the computing system, a record of the first event notification in a database, the record of the first event notification comprising a correlation identifier (ID) and the key;

generating, by the computing system, an event based on the first event notification in a second stream of the streaming event platform, the event indicating an alarm notification;

receiving, by the computing system, a second event notification comprising the key, the second event notification received via the first stream of the streaming event platform;

generating, by the computing system, a record of the second event notification in the database, the record of the second event notification comprising the correlation ID and the key;

determining, by the computing system, that the second event notification is related to the first event notification based at least in part on the correlation ID and the key;

generating, by the computing system, an event indicating an update notification based on the second event notification in the second stream of the streaming event platform; and updating, by the computing system, the second stream to remove the event indicating the alarm notification and the event indicating the update notification such that the second stream is an active-only stream while maintaining a historical record of the events in the first stream, wherein the removal is triggered by a third event notification indicating that the alarm notification has been resolved.

2. The method of claim 1, wherein updating the second stream of the streaming event platform further comprises:

receiving, by the computing system, a third event notification comprising the key, the third event notification received via the first stream of the streaming event platform; and updating, by the computing system, the second stream of the streaming event platform to remove the event indicating the alarm notification and the event indicating the update notification, based at least in part on the third event notification and/or a time-based trigger.

3. The method of claim 2, wherein the third event notification indicates that an active alarm associated with the alarm notification has been resolved.

4. The method of claim 1, wherein the first event notification comprises an active alarm corresponding to a network component.

5. The method of claim 4, wherein the network component is a component of an open radio access network of a 5G wireless network provider.

6. The method of claim 1, wherein the first stream of the streaming event platform comprises events associated with an entity associated with a network component.

7. The method of claim 1, wherein the second stream of the streaming event platform comprises active alarm notifications associated with one or more entities associated with respective network components.

8. The method of claim 1, further comprising:

transmitting, by the computing system and to a user device, data associated with at least one of the first event notification and the second event notification, the data comprising instructions directing the user device to display a most-recent event notification.

9. A system, comprising:

one or more processors; and a non-transitory computer-readable medium comprising instructions that, when executed by the one or more processors, cause the system to perform operations to:

receive a first event notification comprising a key, the first event notification received via a first stream of a streaming event platform;

generate a record of the first event notification in a database, the record of the first event notification comprising a correlation identifier (ID) and the key;

generate an event based on the first event notification in a second stream of the streaming event platform, the event indicating an alarm notification;

receive a second event notification comprising the key, the second event notification received via the first stream of the streaming event platform;

generate a record of the second event notification in the database, the record of the second event notification comprising the correlation ID and the key;

determine that the second event notification is related to the first event notification based at least in part on the correlation ID and the key; and generate an event indicating an update notification based on the second event notification in the second stream of the streaming event platform; and update, by the computing system, the second stream to remove the event indicating the alarm notification and the event indicating the update notification such that the second stream is an active-only stream while maintaining a historical record of the events in the first stream, wherein the removal is triggered by a third event notification indicating that the alarm notification has been resolved.

10. The system of claim 9, wherein the first event notification comprises an active alarm corresponding to a network component.

11. The system of claim 10, wherein a third event notification indicates that the active alarm corresponding to the network component has been cleared.

12. The system of claim 10, wherein the network component is a component of an open radio access network of a 5G wireless network provider.

13. The system of claim 9, wherein the first stream of the streaming event platform comprises event notifications associated with an entity associated with a network component.

14. The system of claim 9, wherein the second stream of the streaming event platform comprises active alarm notifications associated with one or more entities associated with respective network components.

15. The system of claim 9, wherein the system further performs operations to:

transmit, to a user device, data associated with at least one of the first event notification and the second event notification, the data used by the user device to display a most-recent event notification.

16. A non-transitory computer-readable medium comprising instructions that, when executed by one or more processors, cause the one or more processors to perform operations comprising:

receiving, by a computing system, a first event notification comprising a key, the first event notification received via a first stream of a streaming event platform;

generating, by the computing system, a record of the first event notification in a database, the record of the first event notification comprising a correlation identifier (ID) and the key;

generating, by the computing system, an event based on the first event notification in a second stream of the streaming event platform, the event indicating an alarm notification;

receiving, by the computing system, a second event notification comprising the key, the second event notification received via the first stream of the streaming event platform;

generating, by the computing system, a record of the second event notification in the database, the record of the second event notification comprising a correlation ID and the key;

determining, by the computing system, that the second event notification is related to the first event notification based at least in part on the correlation ID and the key;

generating, by the computing system, an event indicating an update notification based on the second event notification in the second stream of the streaming event platform; and updating, by the computing system, the second stream to remove the event indicating the alarm notification and the event indicating the update notification such that the second stream is an active-only stream while maintaining a historical record of the events in the first stream, wherein the removal is triggered by a third event notification indicating that the alarm notification has been resolved.

17. The non-transitory computer-readable medium of claim 16, wherein updating the second stream of the streaming event platform further comprises:

receiving, by the computing system, a third event notification comprising the key, the third event notification received via the first stream of the streaming event platform; and updating, by the computing system, the second stream of the streaming event platform to remove the event indicating the alarm notification and the event indicating the update notification, based at least in part on the third event notification and/or a time-based trigger.

18. The non-transitory computer-readable medium of claim 17, wherein the third event notification indicates that an active alarm associated with the alarm notification has been resolved.

19. The non-transitory computer-readable medium of claim 16, wherein the first event notification comprises an active alarm corresponding to a network component.

20. The non-transitory computer-readable medium of claim 19, wherein the network component is a component of an open radio access network of a 5G wireless network provider.

* * * * *